F. B. PFEIFFER.

TIRE VULCANIZING DEVICE.

APPLICATION FILED APR. 21, 1921.

Reissued June 7, 1921. 15,120.

INVENTOR.

Fred B. Pfeiffer

BY G. E. Ely

ATTORNEY.

UNITED STATES PATENT OFFICE.

FRED BROWN PFEIFFER, OF AKRON, OHIO.

TIRE-VULCANIZING DEVICE.

15,120. Specification of Reissued Letters Patent. Reissued June 7, 1921.

Original No. 1,327,841, dated January 13, 1920, Serial No. 233,496, filed May 9, 1918. Application for reissue filed April 21, 1921. Serial No. 463,361.

*To all whom it may concern:*

Be it known that I, FRED B. PFEIFFER, a citizen of the United States, residing at Akron, in the county of Summit and State of Ohio, have invented a new and useful Tire-Vulcanizing Device, of which the following is a specification.

The device forming the subject matter of this application is adapted to be employed for curing the casings of automobile tires, and the invention aims to provide novel means whereby the curing of the casing may be brought about without pinching or buckling the casing, the necessary heat and pressure being afforded in a single operation.

It is within the province of this disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed. Changes in the precise embodiment of the invention shown can be made without departing from the spirit of the invention.

In the accompanying drawings:—

Figure 1:
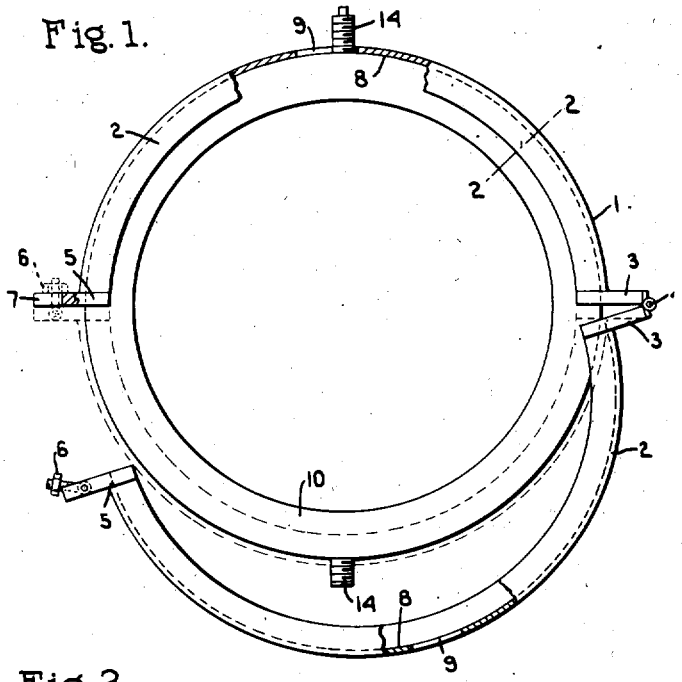
Figure 2:
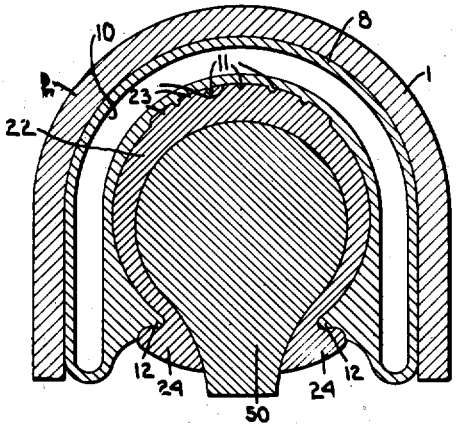
Figure 4:
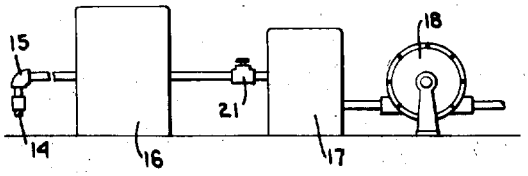
Figure 3:
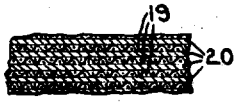

Figure 1 shows in side elevation, a device constructed in accordance with the invention, parts being broken away;

Fig. 2 is a cross section taken on the line 2—2 of Fig. 1; Fig. 3 is a fragmental section of the casing member illustrating details, which, for the sake of clearness, have been omitted in Fig. 2; Fig. 4 is a diagrammatic elevation showing one form of means for supplying heat and pressure.

In carrying out the present invention, there is provided a rigid casing or sheath spaced from the tire, which may be in the form of an annular mold 1 comprising cooperating parts 2 provided at one end with lugs 3 united by a hinge 4 so that the parts 2 of the mold may be opened and closed. The opposite ends of part 2 of the mold are supplied with lugs 5. A latch 6 of any desired construction is pivoted to one of the lugs 5, the other lug 5 having a notch 7 wherein the latch 6 may be received, to hold the parts 2 of the mold together. The mold 1 is provided in its interior with a circumscribing groove 8, and the mold, therefore, may be described as being trough-shaped in cross-section. The parts 2 of the mold are provided with openings 9, which may be oppositely disposed.

Located within the groove 8 of the mold 1 and conforming closely thereto is an annular flexible casing 10 which is trough-shaped in cross section, the casing embodying inner and outer walls. The inner wall of the casing 10 may be supplied, in its tread portion, with projections 11. The inner wall of the casing 10 is provided, adjacent its edges, with inwardly projecting ribs 12. The casing 10 carries oppositely disposed nipples 14 adapted to be received in the openings 9 of the parts 2 of the mold 1. One of the nipples 14 may be connected with a conduit 15, in which is interposed a heater 16, a pressure tank, 17, a pump 18, and a valve 21, the valve 21 being located between the heater 16 and the tank 17.

The casing 10 may be made of any desired material or of any desired combination of materials, but it is desirable that the casing shall be flexible. At the same time it may be so constructed that it will conduct heat. It may be desirable to fashion the casing 10 out of layers of woven wire fabric 19 and alternating layers 20 of rubberized fabric, the constituent layers of the casing being vulcanized to form a unitary structure.

In practical operation, the tire 22 which is to be cured is placed within the casing 10 and the casing 10 is placed in the groove 8 of the mold 1, the nipples 14 passing through the openings 9 in the mold, and the parts 2 of the mold being held closed by means of the latch 6 or its equivalent. A fluid which may be either a liquid or a gas is delivered by the pump 18 to the tank 17 and is let into the heater 16 by opening the valve 21 to any desired degree. From the heater 16, the fluid flows by way of the conduit 15 into the interior of the casing 10, under pressure, and heated to the desired extent, the casing thus being expanded and being forced to grip the tire 22 closely. The projections 11 on the casing 10 form anti-skidding projections 23 on the tire 22, and the ribs 12 form the clencher beads 24 of the tire. It will be obvious, however, that the inner surface of the casing 10 will be shaped as desired, depending upon the nature of the tire which is being cured.

The showing of the drawings as regards the heater 16, the tank 17, the pump 18 and the valve 21 is largely diagrammatic and may be departed from without jeopardizing the utility of the invention.

When the heated fluid is supplied under pressure through one of the nipples 14, the fluid may be permitted to pass out of the other nipple 14, thus securing a circulation, the pressure being maintained, and the construction being such that a series of devices, constructed in accordance with the invention may be connected together. The fluid, under pressure, delivered within the casing 10 causes the casing to expand and to grip the tire 22 closely, outward expansion of the casing being limited by the mold 1, the tire being sustained internally by a form 50. The device is so constructed that it affords the necessary heat and any desired pressure, it being possible to cure a tire casing with a device of the sort hereinbefore set forth, without pinching or buckling the casing, a uniform pressure on the casing being secured throughout the curing operation.

Claims:

1. In a device of the class described, an annular mold; a flexible hollow annular casing disposed within the mold, the casing being trough-shaped in cross section to receive a tire, and being made partly of metal to conduct heat; means for supplying a fluid under pressure to the interior of the casing, and means for heating the fluid prior to its introduction into the casing.

2. In a device of the class described, a rigid outer sheath, surrounding a tire but spaced therefrom, a flexible hollow casing between the sheath and the tire, means to supply fluid under pressure to the casing and means to heat the tire while under pressure.

3. In a device of the character described, a rigid outer sheath substantially trough-shaped in cross-section, a flexible hollow casing within the sheath adapted to receive a tire, a support for the interior of the tire, means to supply fluid under pressure to the casing and means to heat the tire while under pressure.

4. In a device of the character set forth, an outer sheath, the interior surface of which is substantially trough-shaped in cross section, a flexible hollow casing within the sheath adapted to receive a tire, a support for the interior of the tire, means to supply fluid under pressure to the casing and means to heat the tire while under pressure.

5. In an apparatus for vulcanizing tires, a rigid core for supporting the interior of the tire, a flexible and expansible casing on the outside of the tire, means for expanding the said casing to hold the tire under pressure and means for heating the tire while so held.

FRED BROWN PFEIFFER.